(12) United States Patent
Spink

(10) Patent No.: US 6,308,344 B1
(45) Date of Patent: Oct. 30, 2001

(54) WATERPROOF/BREATHEABLE GARMENT CONSTRUCTION

(76) Inventor: Andrew David Spink, 2 Francis Court, Station Road, Ruabon, Wrexham LL14 6DL (GB)

( * ) Notice: Subject to any disclaimer, the term of this patent is extended or adjusted under 35 U.S.C. 154(b) by 0 days.

(21) Appl. No.: 09/486,728

(22) PCT Filed: Sep. 10, 1998

(86) PCT No.: PCT/GB98/02736

§ 371 Date: Apr. 5, 2000

§ 102(e) Date: Apr. 5, 2000

(87) PCT Pub. No.: WO99/12436

PCT Pub. Date: Mar. 18, 1999

(30) Foreign Application Priority Data

Sep. 10, 1997 (GB) .................................................. 9719205

(51) Int. Cl.⁷ .............................. A62B 17/00; A62D 5/00
(52) U.S. Cl. .............................. 2/458; 2/81; 2/82; 2/97; 2/100
(58) Field of Search .......................... 2/81, 82, 97, 100, 2/458

(56) References Cited

U.S. PATENT DOCUMENTS

| | | | |
|---|---|---|---|
| 3,045,243 | * | 7/1962 | Lash et al. |
| 3,706,102 | * | 12/1972 | Grenier ........................................ 2/84 |
| 4,346,509 | * | 8/1982 | Tschan ..................................... 29/451 |
| 5,014,363 | * | 5/1991 | Hubner et al. ......................... 2/243.1 |
| 5,542,124 | * | 8/1996 | Grilliot et al. .............................. 2/81 |
| 5,640,718 | * | 6/1997 | Aldridge ..................................... 2/81 |
| 5,884,332 | * | 3/1999 | Snedeker ................................... 2/97 |
| 6,035,452 | * | 3/2000 | Braxton .................................... 2/455 |
| 6,070,274 | * | 6/2000 | van der Sleesen ....................... 2/456 |

FOREIGN PATENT DOCUMENTS

| | | | |
|---|---|---|---|
| 2737756 | * | 8/1977 | (DE) .............................. B32B/27/28 |
| 0296364 | * | 5/1988 | (EP) .............................. B32B/27/12 |
| 0329411 | * | 2/1989 | (EP) ................................ B32B/5/18 |
| 0397998 | * | 3/1990 | (EP) .............................. A61F/13/04 |

* cited by examiner

Primary Examiner—John J. Calvert
Assistant Examiner—Robert H. Muromoto, Jr.
(74) Attorney, Agent, or Firm—Dennison, Scheiner, Schultz & Wakeman

(57) ABSTRACT

The present invention relates to a garment construction comprising an outer waterproof/breatheable fabric layer to which is attached a reticulated foam to space the inner surface of the outer garment layer from the ordinary clothes of a wearer of the garment, which is suitably a jacket, to enable air flow within the garment to remove water vapour through vents provided in the garment. The garment thereby allows the user to perform strenuous activity whilst remaining dry.

20 Claims, 4 Drawing Sheets

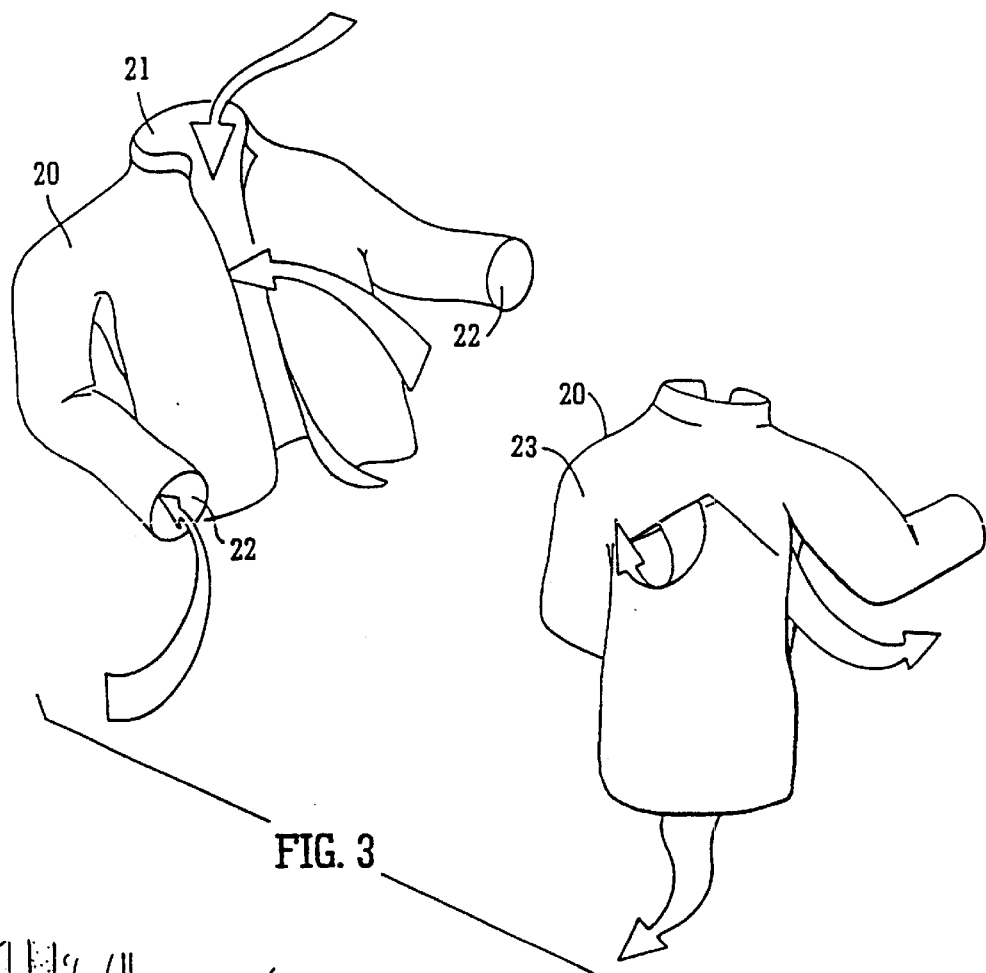
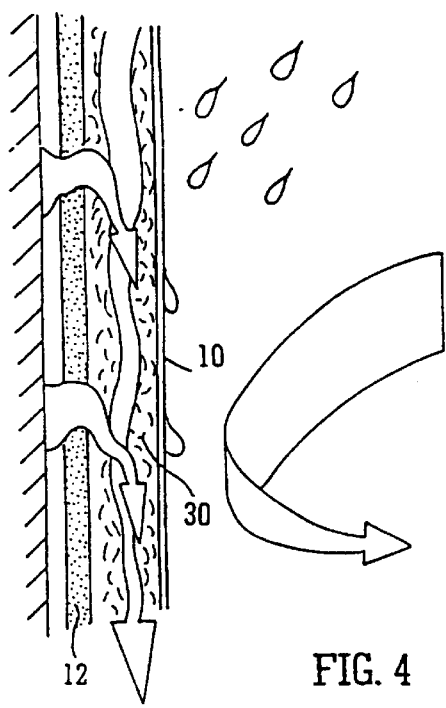
FIG. 3
FIG. 4

WATERPROOF/BREATHEABLE GARMENT CONSTRUCTION

The present invention relates particularly to the construction of waterproof garments or breatheable waterproof garments and to address the particular problem of allowing such to breathe while maintaining the waterproof/water resistant nature of the fabric.

When exercise of any intensity is undertaken whilst wearing waterproof or water-resistant clothing, body moisture evaporated from the skin for the purpose of cooling is unable to escape due to the overlying barrier that is the fabric of the garment. Waterproof/breatheable fabrics came into being to address the problem of condensation accumulation, being resistant to ingress of water, but permeable to water vapour. However, even with a breatheable fabric, moisture condenses on the inside of the fabric and then soaks back into the wearer's clothes, resulting in dampness. Many different approaches to breatheability have produced differing degrees of performance. However, all rely upon temperature and/or humidity gradients to perform—ideally cold dry ambient air externally, and warm, humid air within the garment made from the fabric. Two commonly occurring situations defy these fabrics to perform as well as intended;—

1. Mild/hot, humid climatic conditions that reduce temperature and humidity gradients and so reduce water vapour transmission rates.—see "The Characteristics of Waterproof Breatheable Fabric", Holmes, D. A., Grundy, C and Rowe, H. D., The Journal of Clothing Technology and Management. 1995., 12(3) p.147, Table 2. (See FIG. 1).
2. The body's ability to produce, in the form of sweat, volumes of water vapour that massively exceed the maximum vapour transmission rates of even the best performing fabrics, particularly when high levels of activity are performed for extended periods.—See above mentioned article, p.157, Table 5. (See FIG. 2).

Both of the above situations result in either unevaporated sweat wetting the underlying garments or condensation accumulation within the garment with subsequent dampening of clothes, which in turn produces a chilling effect long after exercise has terminated, leading to excessive heat loss and potentially, to hypothermia.

It is the object of the present invention to seek to provide a construction for a garment which overcomes these problems to a greater extent than previously.

According to the present invention there is provided a garment construction comprising an outer waterproof or breatheable waterproof or water or shower-resistant fabric layer and an inner layer of reticulated foam securable to the inside of the outer fabric layer. The inner layer of reticulated foam may either be permanently secured or detachably secured to the outer fabric layer.

The outer fabric layer may be of any suitable garment fabric, ranging from fully waterproof, coated or laminated fabrics, through various grades of breatheable waterproof fabrics or water vapour permeable fabrics having varying water vapour permeability index (WVPI). The range of fabrics which could be utilised for the outer fabric layer range from single or multilayer fully waterproof fabrics which may be laminated with a waterproof layer, or coated or uncoated fabrics, with or without a water repellent treatment through to laminated fabrics using PTFE or polyester membranes. Examples of suitable breatheable fabrics are: densely woven cotton; woven nylon with hydrophilic coating (PU), woven nylon with hydrophilic polyester membrane; micro-porous expanded PTFE membrane laminated to a woven nylon or polyester fibre; woven polyester or nylon micro-filament.

The reticulated foam is preferably a reticulated polyurethane foam whose cellular network is completely open, i.e., does not contain any closed cell and can range from 8 pores per inch to 90 pores per inch, cell density and from a minimum of 2 millimeters in thickness up to in excess of 30 millimeters, although the preferred range of thickness is 10 millimeters to 20 millimeters, for practical and comfort considerations. Suitable types of foam are currently in use for air-conditioning filtration systems and the like and have been sold under various trade names, for example "Bulpren" (RTM) or "Filtren" (RTM) and more recently as "Selmat" filter foam. The foam can be saw-cut, milled, glued, flame-laminated and die-cut, allowing such to be appropriately adapted for the purposes of the present invention.

The fabric construction is intended to be utilised for producing outdoor garments, particularly suitable for use when undergoing strenuous outdoor activity, for example, mountain biking, running or hiking and can be formed into jackets or coats to be worn over ordinary clothing, for example as a waterproof jacket. Such a jacket would includes means for holding the collar and cuffs at least partially open during activity to allow air flow through the garments and could suitably include underarm and rear vents for additional ventilation, all of which could be closed following activity, or during periods of inactivity, to prevent excessive cooling of the wearer. Whilst the invention is primarily intended to be used with waterproof/breatheable jackets, it is envisaged that such a construction could be utilised for other types of garments, according to circumstance, and a jacket could of course be of a long-sleeved or short-sleeved variety.

With a garment constructed as outlined, the water vapour generated by perspiration during exercise can be rapidly removed from within the waterproof garment by virtue of the air gap provided by the reticulated foam, which spaces the outer waterproof layer from the clothing of the wearer, minimising dampening thereof. Water vapour would be carried out of the garment on currents of air moving through this gap provided by the reticulated foam via various openings in the garment itself, i.e. via the cuffs, collar, vents etc. A discussion of breatheability can be found in 'What Breathability do you need' Wouter, A. Symposium 'Breathe', Stratford on Avon, Jun. 5, 1991. Pg 7 para 2.

When exercise is terminated and sweating stops, the waterproof garment can be closed down at the collars and cuffs etc., and closing the front and vent fastenings etc., to stop air movement through the garment. Body heat would be retained to evaporate residual sweat in the underlying garment and evaporate such as vapour through the waterproof and breatheable fabric of the outer layer. Whilst in the case of a fully waterproof garment any accumulated condensation on the inner surface of the waterproof fabric would be unable to soak back into the clothes due the space maintained by the reticulated foam layer.

The present invention will now be described further, by way of example, with reference to the accompanying drawings, in which:

FIG. 3 illustrates the air flow in a garment constructed according to the present invention;

FIG. 4 illustrates the construction and mechanism of the garment construction of the present invention;

Figure 1:
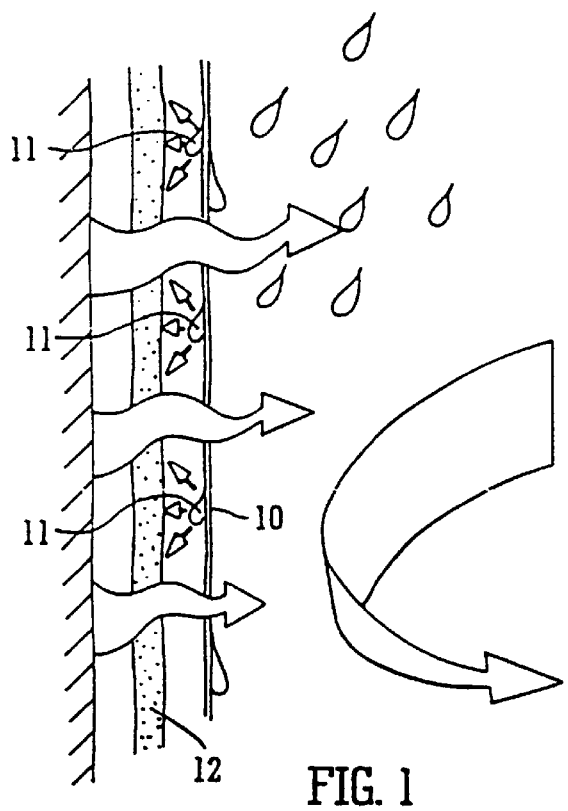
FIGS. 1 and 2 illustrate the current situation and problems with waterproof clothing.
Figure 2:
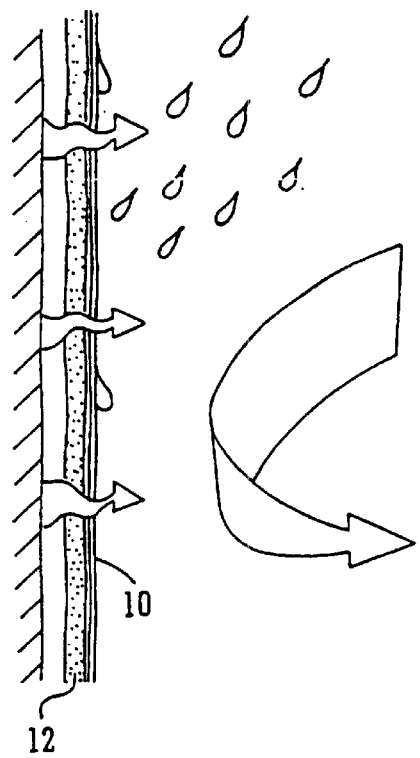

Referring now to the drawings, FIGS. 1 and 2, as mentioned previously, illustrate the problems with current types of waterproof garments in that, during high levels of activity the breatheability characteristics of the outer fabric layer (10) are not sufficiently efficient to enable all of the water vapour (11) generated by sweating or condensation to be transmitted to the outside of the garment, with the result that some of the water vapour condenses on the inside of the fabric layer and soaks back into the clothing (12) of the wearer.

Referring now to FIGS. 3 and 4, a garment (20) constructed according to the present invention is shown as a jacket having open neck (21), cuffs (22) and vents (23), which are open during high levels of activity, to allow the free flow of air within the garment (20) to assist in the transmission of water vapour generated by sweating from within the waterproof garment. FIG. 4 illustrates the construction and performance of such an arrangement in that the outer waterproof breatheable fabric (10) prevents ingress of external water e.g. rain, whilst by the interposition of the reticulated foam (30) also prevents any water vapour, which may condense on the inside of the waterproof fabric layer (10) and unable to escape, due to the limitations of the breatheability of the fabric, from contacting the clothing of the wearer (12), said water vapour being carried away by the movement of air between the waterproof breatheable outer layer (10) and the clothing (12) by means of air movement through the reticulated foam (30).

Figure 5:
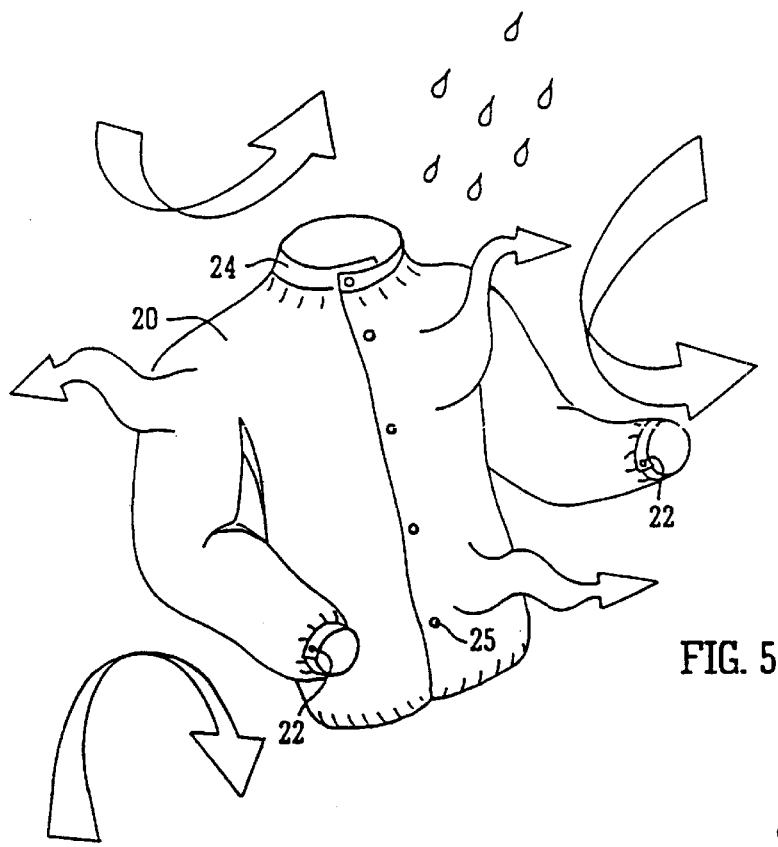
FIG. 5 illustrates the functioning of the garment constructed according to the present invention when closed down after exercise.
Figure 6:
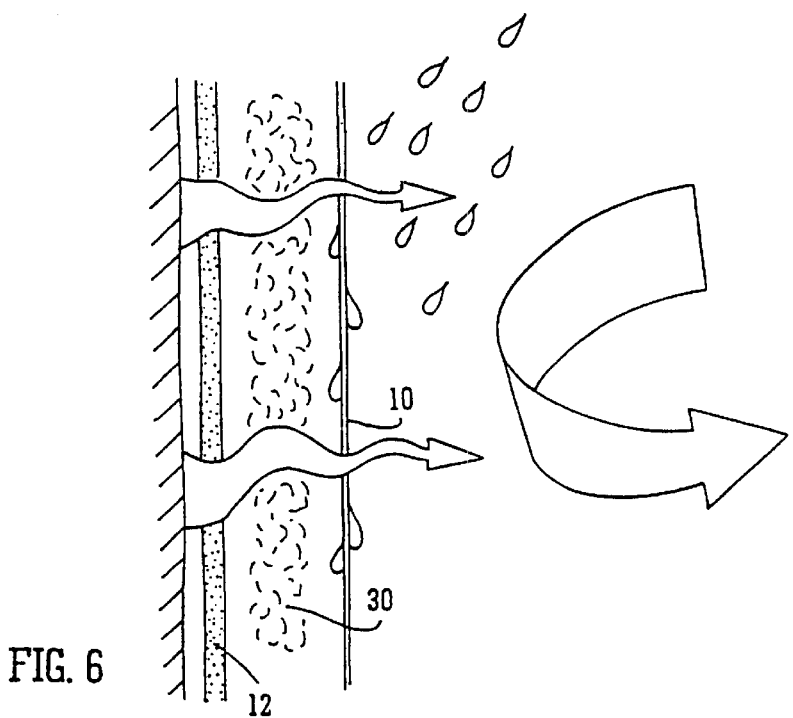
FIG. 6 illustrates the functioning of the construction of the present invention according to the conditions of FIG. 5.

Referring now to FIGS. 5 and 6, after exercise has been completed, the garment (20) may be closed down by tightening the cuffs (22) and collar (24), overbuttoning the front flap (25) and closing down any vents (23) to avoid excessive air flow when exercise is completed from causing wind chill or excessive cooling of the wearer, whilst the reticulated foam (30) maintains the air-gap between the outer waterproof fabric layer (10) and the clothing (12) of the wearer to prevent any dampening of the wearers own clothing underneath the said garment from condensation.

With regard to the application of the reticulated foam (30) to the inner surface of the waterproof fabric of the garment, such can be attached by any appropriate means, but for example, could be glued thereto or attached with pop-fasteners or hook and loop type fasteners. Alternatively, the foam could be suspended on either side of a fabric liner using, for example, toggle fasteners, split ring clips, zip ties, stitching or pop-fasteners, or the reticulated foam could be suspended between two layers of fabric mesh, or in mesh pockets provided between the two layers.

Figure 7A:
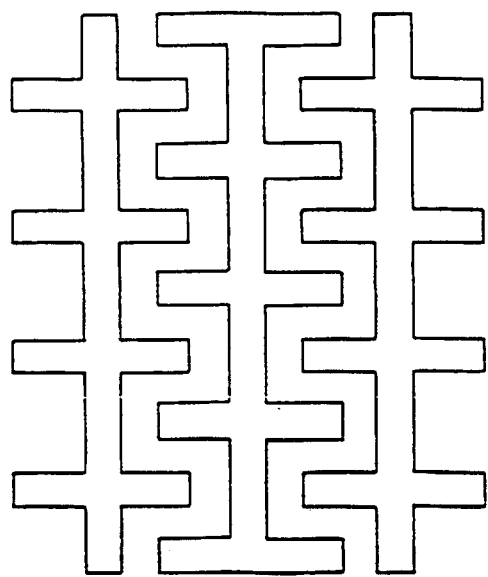
FIGS. 7a and 7b illustrate various configurations of foam to improve the flexibility and movement characteristics of the garment.
Figure 7B:
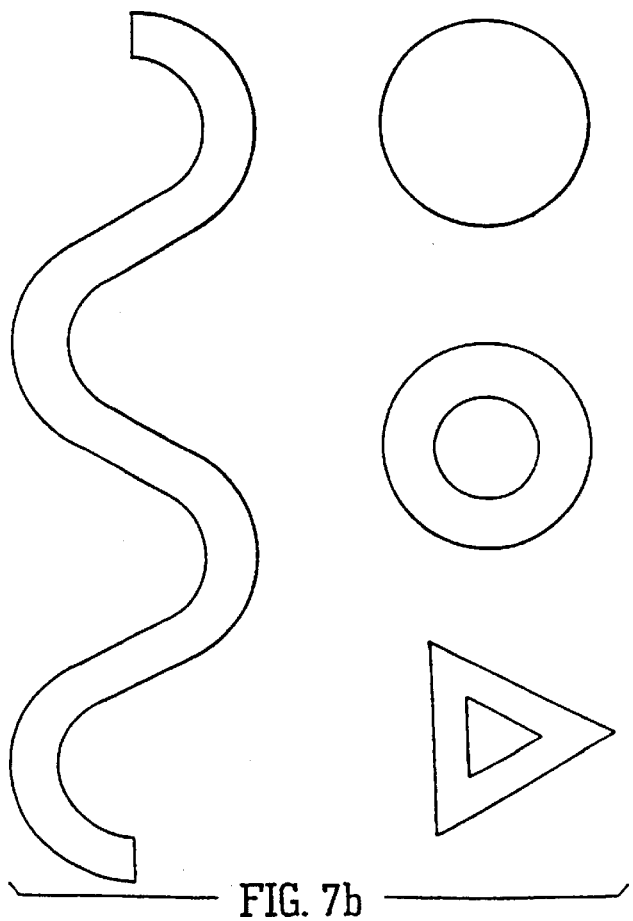

The reticulated foam layer (30) can be a substantially continuous sheet, lining most, if not all, of the garment, or such foam could have openings cut therein, or be cut into various shapes to maximise air exchange and to give better flexibility and movement to the garment. Examples of possible configurations of the foam which could be utilised either throughout the garment or in specific locations around the garment according to function, are shown in FIGS. 7a and 7b.

As mentioned above, the reticulated foam layer can be as thin as 2 mm, but generally would be in excess of 5 mm in thickness. Very thick layers are likely to be impractical for most the intended purposes, and it has been found that a thickness of between 10 mm and 20 mm is most likely to produce optimum air-flow and be of the most practical value, although layers in excess of 30 mm could be envisaged. The reticulated foam itself is available in various densities, and as previously mentioned is of a polyester or polyether-based polyurethane and generally lower 'density' foams provide maximum air-flow and are therefore more desirable, although such cannot be cut as thinly as higher density foams.

What is claimed is:

1. A garment construction comprising an outer waterproof or breatheable waterproof or water-resistant or showerproof fabric layer and an inner layer of reticulated foam securable to the outer fabric layer.

2. A garment construction as claimed in claim 1, in which the inner layer of reticulated foam is permanently secured to the outer fabric layer.

3. A garment construction as claimed in claim 1, in which the garment is a jacket constructed from said outer layer, panels of which have said inner reticulated foam layer secured thereto, including at least a portion of the sleeves of said jacket.

4. A garment construction as claimed in claim 3, in which means are provided for maintaining a flow of air through the collars and cuffs of the jacket, but which are also closeable, particularly during periods of inactivity.

5. A garment construction as claimed in claim 3, in which additional vents are provided as underarm and/or rear vents to allow egress of moist air from the garment.

6. A garment construction as claimed in claim 1 in which the reticulated foam comprises a polyester- or polyether-based polyurethane foam having a cell density of between 8 pores per inch to 90 pores per inch and having a thickness of between 5 millimeters and in excess of 30 millimeters.

7. A garment construction as claimed in claim 6, in which the thickness of the foam layer is between 10 and 20 millimeters.

8. A garment construction as claimed in claim 6, in which the foam has the density between 10 and 50 pores per inch.

9. A garment construction as claimed in claim 1, in which the reticulated foam is attached to the inner surface of the outer fabric layer by means of an adhesive.

10. A garment construction as claimed in claim 1, in which the reticulated foam is attached to the inside surface of the outer fabric layer by means of pop-fasteners, or hook and loop fasteners.

11. A garment construction as claimed in claim 1, in which the foam layer is attached to a fabric liner attachable to the inside surface of the outer fabric layer.

12. A garment construction as claimed in claim 11, in which the reticulated foam layer is attached to the fabric liner using toggle fasteners, split-ring clips, zip-ties, stitching or pop-fasteners.

13. A garment construction as claimed in claim 1, in which the reticulated foam is suspended between two layers of fabric mesh permanently or detachably securable to the inner surface of the outer fabric layer.

14. A garment construction as claimed in claim 13, in which the fabric mesh is formed as pockets detachably securable or permanently attached to the inner surface of the outer fabric layer for removably receiving reticulated foam portions.

15. A garment construction as claimed in claim 1, in which the reticulated foam layer comprises portions of a variety of shapes and configurations adapted to maximise air exchange and to impart flexibility and comfort to the garment, whilst maintaining the required spacing between the outer fabric layer and the inside of the garment.

16. A garment construction as claimed in claim 1, in which the outer fabric layer comprises a fully waterproof fabric construction.

17. A garment construction as claimed in claim 1, in which the outer fabric layer comprises a breathable/water vapour permeable fabric.

18. A garment construction as claimed in claim 17 in which the breatheable/water vapour permeable fabric comprises two or more layers, at least one of which is of a textile material and at least one of which is a substantially continuous polymeric film.

19. A garment construction as claimed in claim 17 in which the outer fabric is selected from the group of: woven nylon with hydrophilic coating (PU); woven nylon with hydrophilic polyester membrane; micro-porous expanded PTFE membrane laminated to a nylon woven or knitted or polyester fibre; woven polyester or nylon microfilament; or densely woven cotton.

20. A garment construction as claimed in claim 17 in which said breatheable fabric comprises a textile material laminated with an expanded PTFE or polyester membrane.

* * * * *